(12) United States Patent
Von Bokern et al.

(10) Patent No.: US 8,595,536 B2
(45) Date of Patent: Nov. 26, 2013

(54) RATE VERIFICATION OF AN INCOMING SERIAL ALIGNMENT SEQUENCE

(75) Inventors: Vincent E. Von Bokern, Rescue, CA (US); Serge Bedwani, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 13/014,615

(22) Filed: Jan. 26, 2011

(65) Prior Publication Data

US 2011/0141605 A1     Jun. 16, 2011

Related U.S. Application Data

(63) Continuation of application No. 10/750,056, filed on Dec. 30, 2003, now Pat. No. 7,934,112.

(51) Int. Cl.
| | |
|---|---|
| G06F 1/12 | (2006.01) |
| G06F 13/42 | (2006.01) |
| H04L 5/00 | (2006.01) |
| H04L 7/00 | (2006.01) |
| G06F 1/00 | (2006.01) |
| G11B 15/18 | (2006.01) |
| G11B 17/00 | (2006.01) |
| G11B 19/02 | (2006.01) |

(52) U.S. Cl.
USPC .............................. 713/400; 713/500; 360/69

(58) Field of Classification Search
USPC ............................................ 713/400; 360/69
See application file for complete search history.

(56) References Cited

U.S. PATENT DOCUMENTS

| | | | |
|---|---|---|---|
| 3,727,203 A * | 4/1973 | Crossman | ................... 360/72.2 |
| 4,524,345 A | 6/1985 | Sybel et al. | |
| 5,987,085 A | 11/1999 | Anderson | |
| 6,009,488 A | 12/1999 | Kavipurapu | |
| 6,407,682 B1 | 6/2002 | Jones | |
| 6,490,316 B1 | 12/2002 | Motegi et al. | |
| 6,581,114 B1 | 6/2003 | Sturm | |
| 6,647,444 B2 | 11/2003 | Lueker et al. | |
| 7,149,825 B2 | 12/2006 | Bunker et al. | |
| 2002/0046276 A1 | 4/2002 | Coffey et al. | |
| 2003/0068024 A1 | 4/2003 | Jones et al. | |
| 2004/0047291 A1 | 3/2004 | Ain et al. | |

(Continued)

FOREIGN PATENT DOCUMENTS

| | | |
|---|---|---|
| EP | 0481267 | 4/1992 |
| JP | 62171248 | 7/1987 |
| WO | WO-02/079988 | 10/2002 |

OTHER PUBLICATIONS

International Search Report and Written Opinion; PCTUS2004/043337, mailed Jun. 10, 2005.

(Continued)

*Primary Examiner* — Kim Huynh
*Assistant Examiner* — Brandon Kinsey
(74) *Attorney, Agent, or Firm* — Blakely, Sokoloff, Taylor & Zafman LLP

(57) ABSTRACT

A technique for rate verification of an incoming serial alignment sequence includes receiving an incoming serial stream. A determination is then made as to whether an align sequence is recognized in the incoming serial stream. When an align sequence is recognized, a check is made to determine if an appropriate number of align primitives are received during a predetermined number of clock periods. If the number of received align primitives matches the predetermined number, then a rate-verified align detect signal is asserted.

30 Claims, 6 Drawing Sheets

(56) References Cited

U.S. PATENT DOCUMENTS

2004/0057539 A1* 3/2004 Boles et al. .................. 375/354
2004/0113814 A1 6/2004 Lochner

OTHER PUBLICATIONS

Intel Corp., Non Final Office Action mailed Aug. 30, 2010; U.S. Appl. No. 10/750,056.

* cited by examiner

US 8,595,536 B2

1

RATE VERIFICATION OF AN INCOMING SERIAL ALIGNMENT SEQUENCE

CROSS-REFERENCE TO RELATED APPLICATION

This application is a continuation of pending U.S. patent application Ser. No. 10/750,056 filed Dec. 30, 2003 entitled RATE VERIFICATION OF AN INCOMING SERIAL ALIGNMENT SEQUENCE, which issued as U.S. Pat. No. 7,934,112 on Apr. 26, 2011.

FIELD OF THE INVENTION

The present invention pertains to the field of semiconductor devices. More particularly, this invention pertains to the field of serial transmission alignment.

BACKGROUND OF THE INVENTION

In today's computer systems, some computer system component interconnect protocols provide techniques to establish and to maintain synchronization. One such protocol is the Serial ATA protocol (Serial ATA Specification rev. 1.0 released Jun. 28, 2001). This protocol allows communication between two devices such as a disk controller and a disk drive. The Serial ATA specification provides for a serial interconnect using differential pair signaling. The Serial ATA specification further provides for periodic transmission of alignment primitives. The alignment primitive is a predetermined pattern of bits of a predetermined length that is recognized by devices coupled to the interconnect. The alignment primitive allows devices that have lost synchronization to recover bit-boundary alignment.

The alignment method provided for in the Serial ATA specification involves the transfer of ALIGN primitives across the interface. The ALIGN primitive is a four byte sequence. The first byte of the primitive is an encoded K28.5 character (rd+: 1100000101; rd−: 0011111010). The receiving device compares the first character of the incoming ALIGN primitive with the expected K28.5 character. If there is a match, then the receiving device is assumed to be synchronized.

The above mentioned method is susceptible to false detection of ALIGN primitives that are being sent at a different rate than expected, or false interpretation of noise on the interconnect wires as a valid ALIGN primitive.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
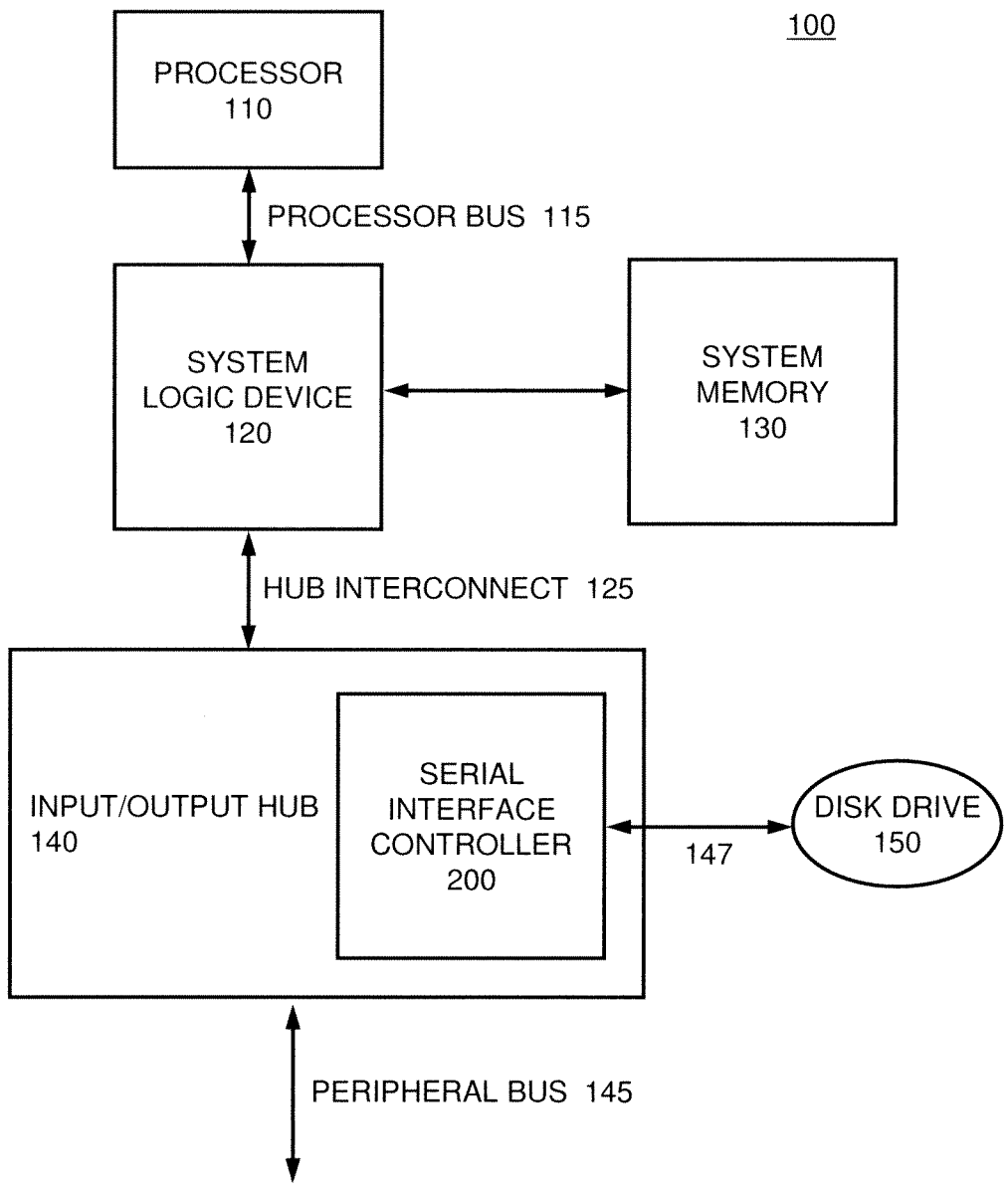
FIG. 1 is a block diagram of one embodiment of a computer system including a serial interface controller coupled to a disk drive.

FIG. 1 is a block diagram of one embodiment of a computer system 100 including a serial interface controller 200 coupled to a disk drive 150. The serial interface controller 200 is included in an input/output hub 140 which is also coupled to a peripheral bus 145.

The computer system 100 also includes a system logic device 120 that is coupled to the input/output hub 140 via a hub interconnect 125. The system logic device 120 is coupled to a processor 110 and is also coupled to a system memory 130.

The serial interface controller 200 is coupled to the disk drive 150 via an interconnect 147. For this example embodiment, the interconnect 147 is implemented in accordance with the Serial ATA specification. Other embodiments are possible using other interconnect implementations. For this example embodiment, the interconnect 147 includes one differential pair of signals that deliver data from the controller 200 to the disk drive 150 and another differential pair of signals that deliver data from the disk drive 150 to the controller 200.

Periodically, the serial interconnect controller 200 receives an align sequence over the interconnect 147. The align sequence includes a series of align primitives. For this embodiment, an align primitive is a four byte sequence, with the first byte including an encoded K28.5 character.

Figure 2:
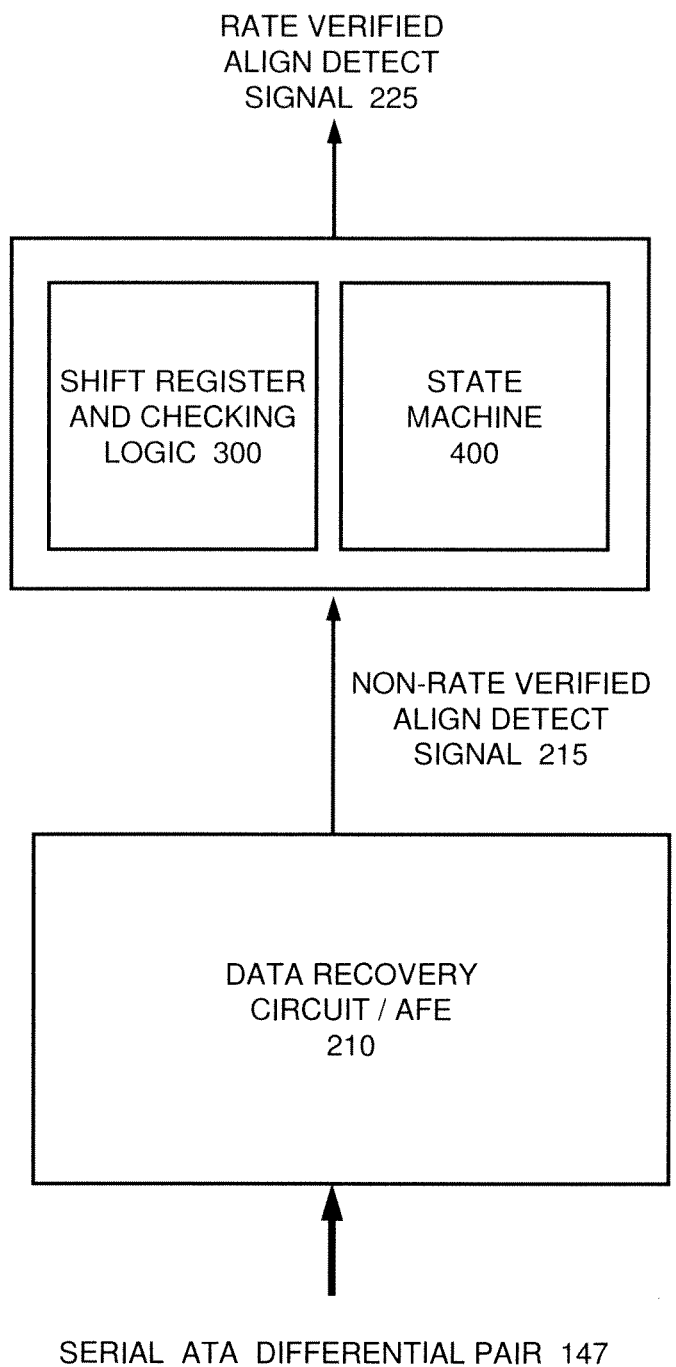
FIG. 2 is a block diagram of one embodiment of an apparatus for rate verification of an incoming serial alignment sequence including a shift register, a checking logic unit, and a state machine.

FIG. 2 is a block diagram of one embodiment of an apparatus for rate verification of an incoming serial alignment sequence including a shift register, a checking logic, and a state machine. The embodiment of FIG. 2 may be implemented in a serial interconnect controller such as the controller 200 shown in FIG. 1. A data recovery circuit/analog front end (AFE) 210 receives an input stream over the serial ATA differential pair 147. The unit 210 asserts a non-rate verified align detect signal 215 whenever a K28.5 character is recognized coming in with the input stream. The non-rate verified align detect signal 215 is received at a shift register and checking logic unit 300 and a state machine 400. The units 300 and 400 are discussed below in connection with FIGS. 3a, 3b, and 4.

The units 300 and 400 together determine whether the incoming align primitives are being received at a target rate. If the rate of the incoming align primitives matches the target rate, then a rate verified align detect signal 225 is asserted and delivered to the core logic of the serial interconnect controller 200. One use of the rate verified align detect signal 225 is for speed negotiation in compliance with the Serial ATA specification for the serial interconnect 147. The serial interconnect controller 200 can use the rate verified align detect signal to know whether the incoming serial stream is being received at the target rate or some other rate.

Figure 3A:
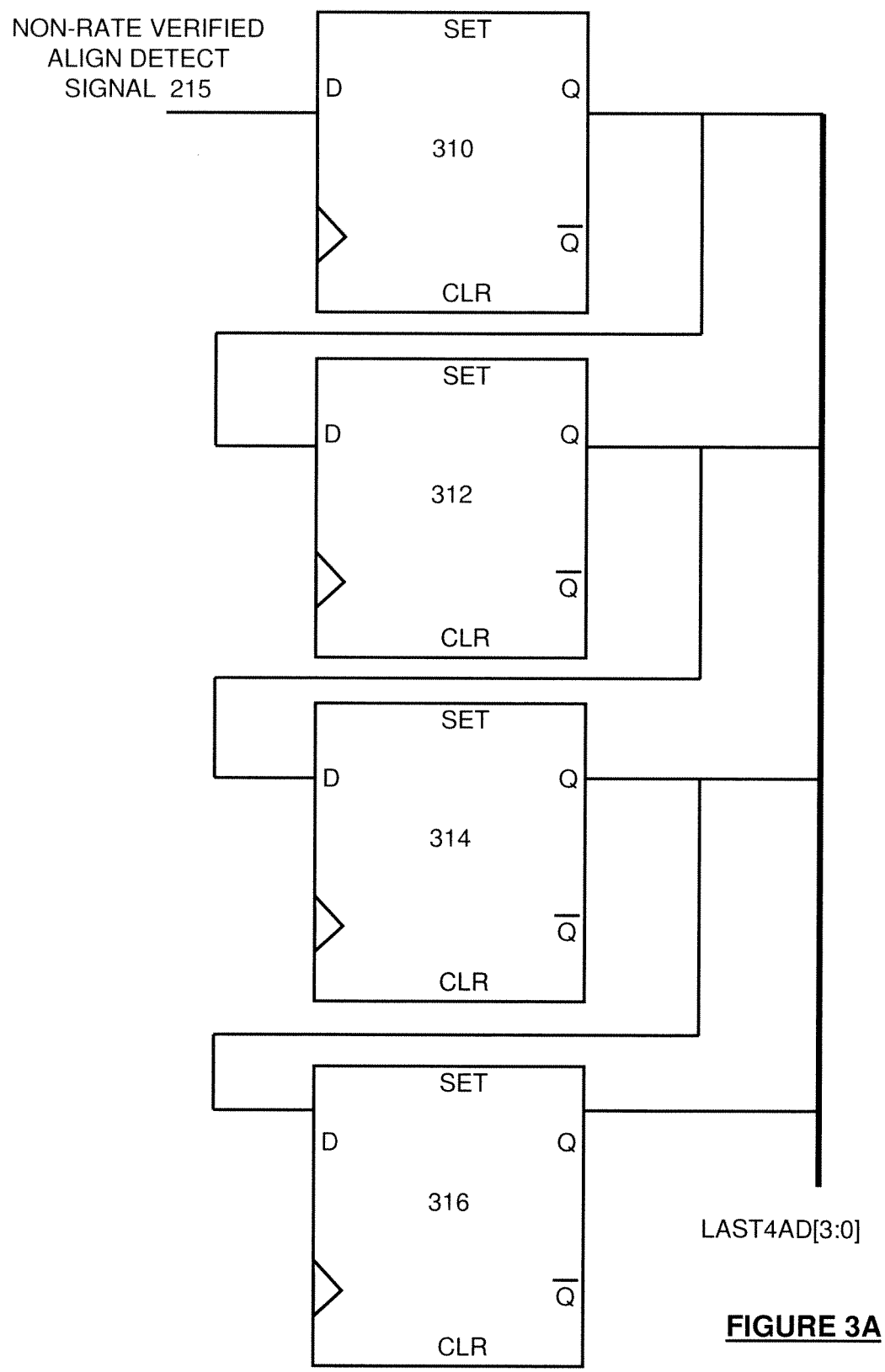
FIG. 3a is a block diagram of a shift register.

FIG. 3a is a block diagram of one embodiment of the shift register of unit 300. The non-rate verified align detect signal 215 is received at a flip-flop 310. The flip-flop 310 is clocked at a target clock rate. The output of the flip-flop 310 is denoted as Last Align Detect Signal 0 (LastAD[0]). The output of the flip-flop 310 is delivered to a flip-flop 312. The flip-flop 312 is also clocked at the target rate. The output of the flip-flop 312 is denoted as LastAD[1] and is delivered to a flip-flop 314. The flip-flop 314 is also clocked at the target rate. The output of the flip-flop 314 is denoted as LastAD[2] and is delivered to a flip-flop 316. The flip-flop 316 is also clocked at the target rate. The output of the flip-flop 316 is denoted as LastAD[3].

Figure 3B:
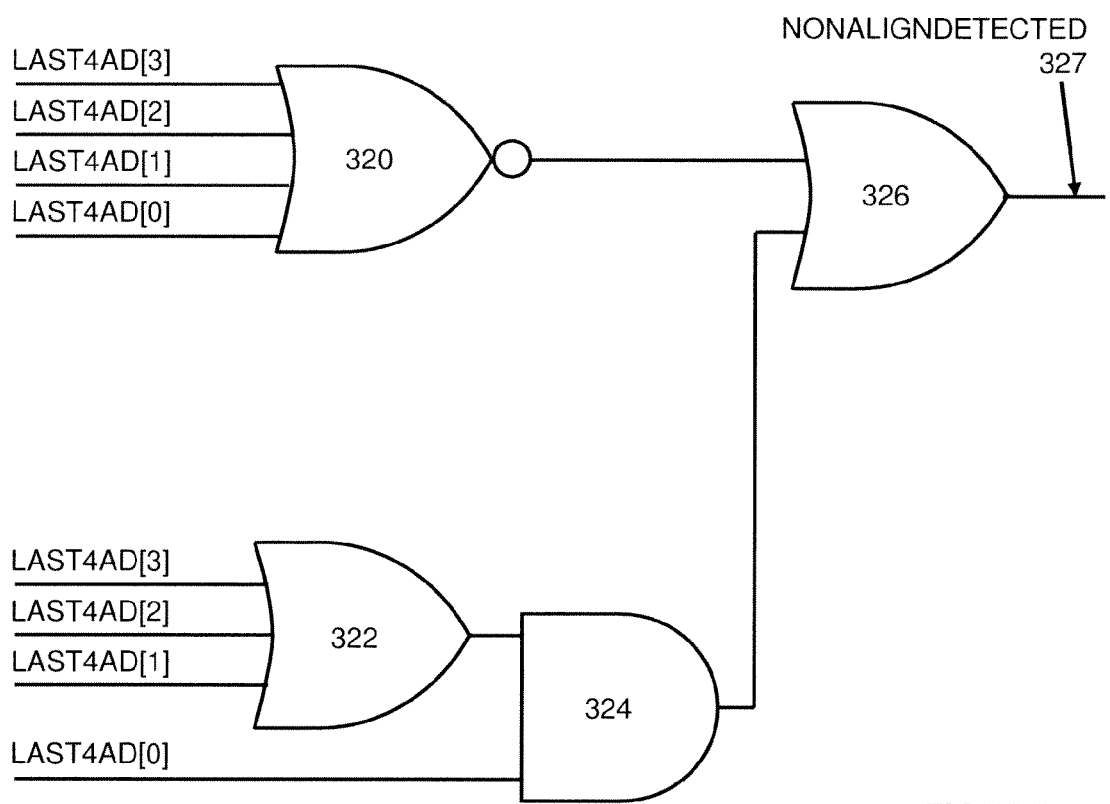
FIG. 3b is a block diagram of a checking logic unit.

FIG. 3b is a block diagram of the checking logic unit of unit 300. A NOR gate 320 receives at its inputs LastAD[3:0]. An OR gate 322 receives as its input LastAD[3:1]. The output of the OR gate 322 is delivered to an input of an AND gate 324 along with signal LastAD[0]. The outputs of the NOR gate 320 and the AND gate 324 are received at an OR gate 326.

The output of the NOR gate 320 becomes asserted (logical "1") if none of the LastAD[3:0] signals indicates a receipt of an align primitive during the last four samples of the non-rate verified align detect signal 215, indicating that an align sequence is not being recognized at the target frequency.

The output of the AND gate 324 becomes asserted if there are more than one K28.5 characters sampled in a 4 byte sequence. If either the output of the NOR gate 320 or the output of the AND gate 324 becomes asserted, then a nonaligndetected signal 327 becomes asserted.

Figure 4:
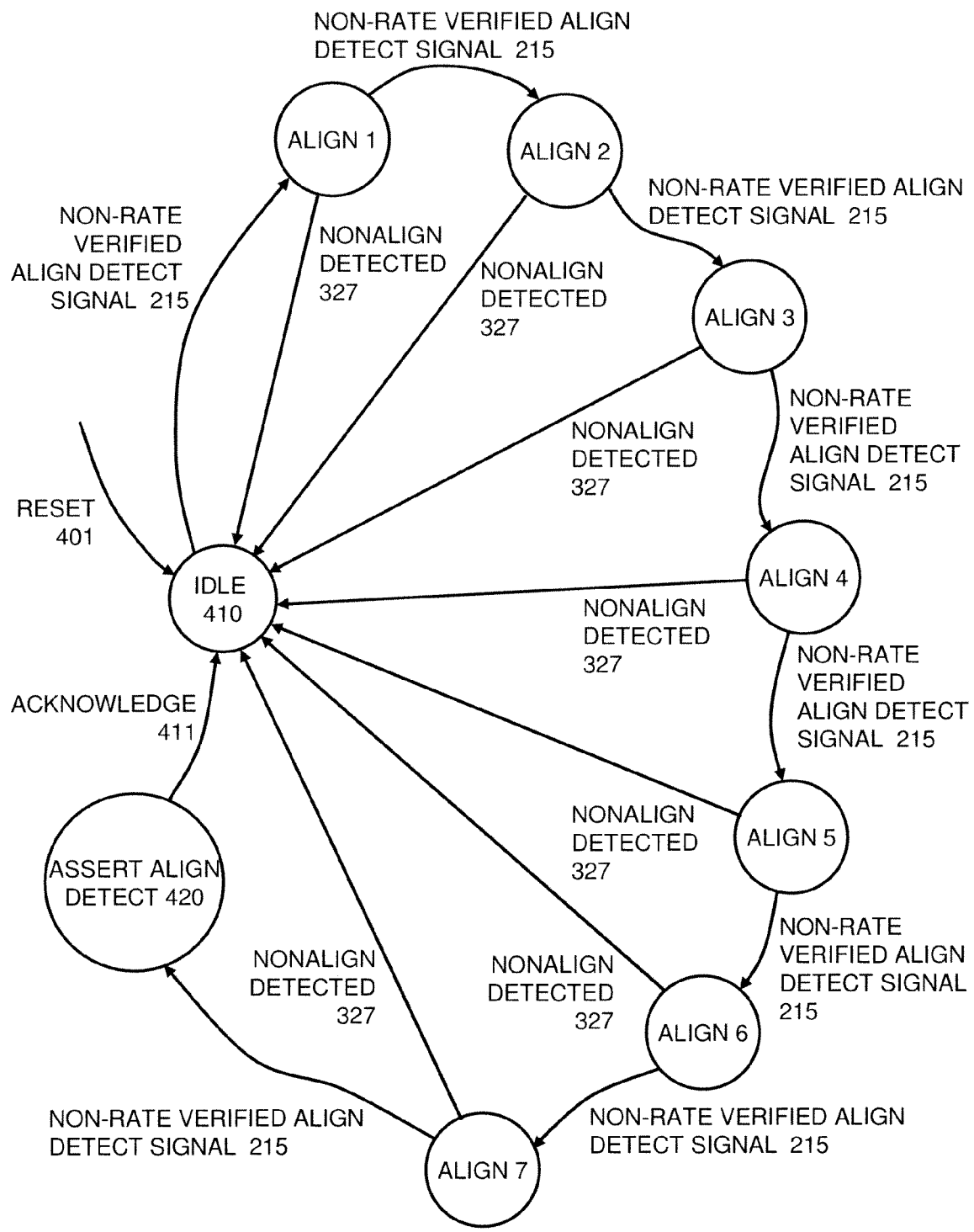
FIG. 4 is a diagram of a state machine.

FIG. 4 is a diagram of the state machine 400. The state machine 400 is essentially a counter that looks for a predetermined number of align detects and resets any time one of the disqualifying events mentioned above in connection with FIG. 3b occurs (nonaligndetected signal 327 asserted). The final state holds the rate verified align detect signal 225 asserted until an acknowledge signal is returned from the serial interconnect controller 200 core logic.

Upon receiving an asserted reset signal 410, the state machine starts at an idle state 410. An assertion of the non-rate verified align detect signal 215 causes the state machine to enter the align 1 state. An assertion of the nonaligndetected signal 327 causes the state machine to return to the idle state 410, and if no assertion of the nonaligndetected signal 327, then an assertion of the non-rate verification align detect signal 215 causes the state machine to enter an align 2 state. An assertion of the nonaligndetected signal 327 causes the state machine to return to the idle state 410, and if no assertion of the nonaligndetected signal 327, then an assertion of the non-rate verification align detect signal 215 causes the state machine to enter an align 3 state. An assertion of the nonaligndetected signal 327 causes the state machine to return to the idle state 410, and if no assertion of the nonaligndetected signal 327, then an assertion of the non-rate verification align detect signal 215 causes the state machine to enter an align 4 state. An assertion of the nonaligndetected signal 327 causes the state machine to return to the idle state 410, and if no assertion of the nonaligndetected signal 327, then an assertion of the non-rate verification align detect signal 215 causes the state machine to enter an align 5 state. An assertion of the nonaligndetected signal 327 causes the state machine to return to the idle state 410, and if no assertion of the nonaligndetected signal 327, then an assertion of the non-rate verification align detect signal 215 causes the state machine to enter an align 6 state. An assertion of the nonaligndetected signal 327 causes the state machine to return to the idle state 410, and if no assertion of the nonaligndetected signal 327, then an assertion of the non-rate verification align detect signal 215 causes the state machine to enter an align 7 state. An assertion of the nonaligndetected signal 327 causes the state machine to return to the idle state 410, and if no assertion of the nonaligndetected signal 327, then an assertion of the non-rate verification align detect signal 215 causes the state machine to enter the assert align detect state 420. It is during the state 420 that the rate-verified align detect signal is asserted to the core logic. The state machine remains in state 420 until the acknowledge signal 411 is returned from the core logic. The state machine then returns to the idle state 410 and the process repeats.

Although the state machine 400 includes counting eight assertions of the non-rate verified align detect signal 215, other embodiments are possible using other number counts. The appropriate count number may be a function of the factors that may introduce errors in the signature of an align sequence at the target rate.

Figure 5:
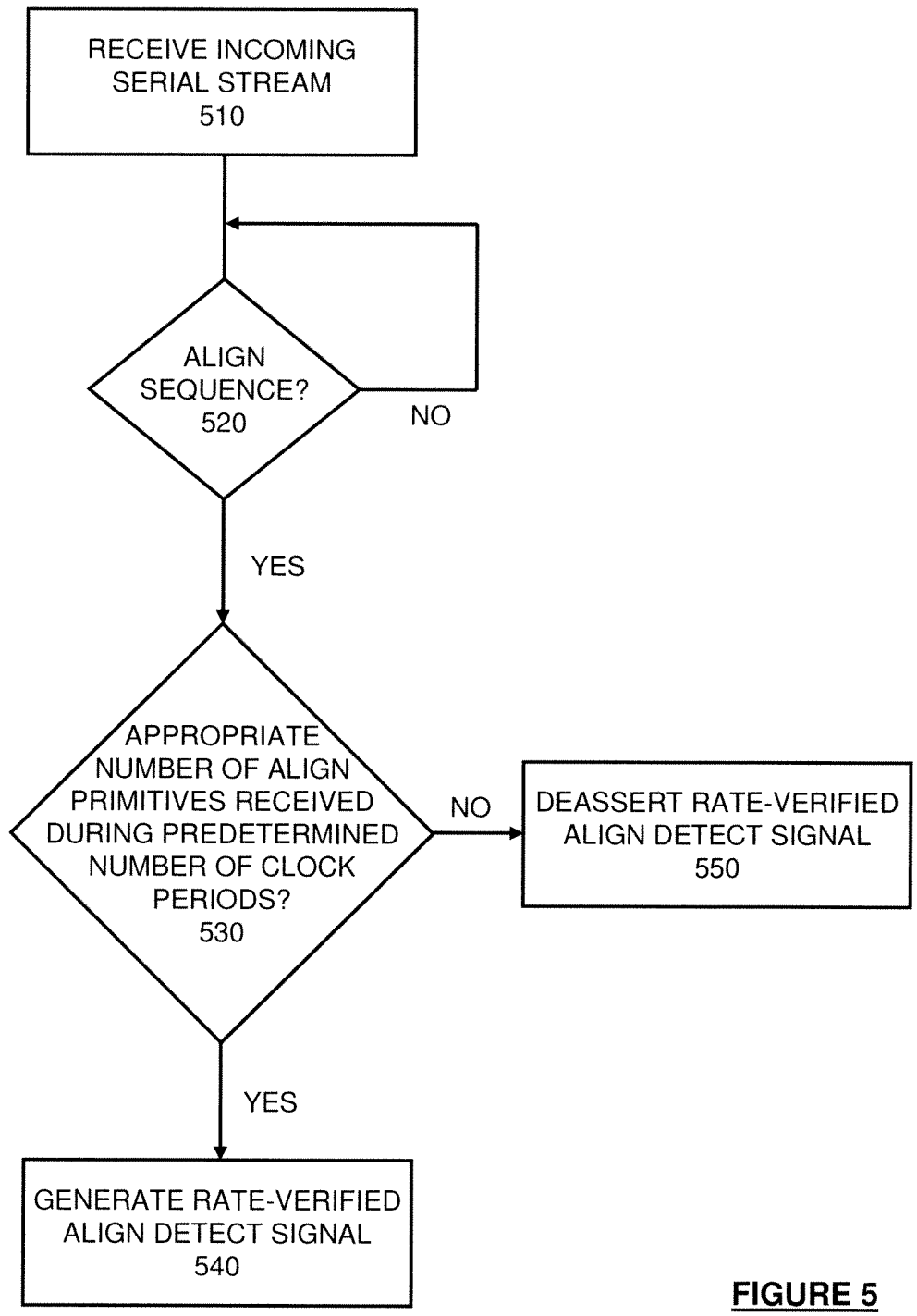
FIG. 5 is a flow diagram of one embodiment of a method for rate verification of an incoming serial alignment sequence.

FIG. 5 is a flow diagram of one embodiment of a method for rate verification of an incoming serial alignment sequence. At block 510, an incoming serial stream is received. Then, at block 520 a determination is made as to whether an align sequence is recognized in the incoming serial stream. When an align sequence is recognized, then processing proceeds to block 530. At block 530, a check is made to determine if an appropriate number of align primitives are received during a predetermined number of clock periods. Blocks 540 and 550 indicate that if the number of received align primitives matches the predetermined number, then a rate-verified align detect signal is asserted.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
an input to receive a non-rate verified align detect signal over a serial interconnect;
a rate verification unit to determine whether incoming align primitives are received at a target clock rate during a predetermined number of clock periods, the rate verification unit including a shift register that is clocked at the target clock rate; and
an output to deliver a rate-verified align detect signal to a core logic of the apparatus.

2. The apparatus of claim 1, the rate verification unit further including a checking logic unit.

3. The apparatus of claim 2, the rate verification unit further including a state machine.

4. The apparatus of claim 1, the shift register having a first flip flop to receive a non-rate verified align detect signal.

5. The apparatus of claim 1, the shift register having a first flip flop to output a first Last Align Detect signal.

6. The apparatus of claim 5, the shift register further including a second, a third, and a fourth flip-flop; the second flip-flop to receive the first Last Align Detect signal and to output a second Last Align Detect signal; the third flip-flop to receive the second Last Align Detect signal and to output a third Last Align Detect signal; and the fourth flip-flop to receive the third Last Align Detect signal and to output a fourth Last Align Detect signal.

7. The apparatus of claim 6, the rate verification unit further including a checking logic unit; the checking logic unit to receive the first, second, third, and fourth Last Align Detect signals from the shift register; the checking logic unit to assert a nonaligndetected signal if each of the values of the first, second, third, and fourth Last Align Detect signals are zero.

8. The apparatus of claim 7, the checking logic unit further to assert the nonaligndetected signal if more than one K28.5 character is sampled in a 4-byte sequence.

9. The apparatus of claim 7, the rate verification unit further including a state machine, the state machine to count up to n align detects, the count to increase each time the non-rate verified align detect signal is asserted and the count to reset each time the nonaligndetected signal is asserted.

10. The apparatus of claim 9, the state machine to cause the rate-verified align detect signal to be asserted.

11. The apparatus of claim 10, the state machine to keep the rate-verified align detect signal asserted until an acknowledge signal is received.

12. A system, comprising:
a serial interconnect host controller implemented according to a Serial ATA specification, the serial interconnect host controller including:
a data recovery circuit to receive incoming serial input stream over a serial interconnect and to output a non-rate verified align detect signal;
a rate verification unit to determine whether incoming align primitives are received at a target clock rate during a predetermined number of clock periods, and to deliver a rate-verified align detect signal to a core logic of the serial interconnect host controller, the rate verification unit including a shift register that is clocked at the target clock rate; and
a system component coupled to the serial interconnect host controller via the serial interconnect.

13. The system of claim 12, wherein the system component is a mass storage device.

14. The system of claim 12, the rate verification unit further including a checking logic unit.

15. The system of claim 12, the shift register having a first flip flop to receive a non-rate verified align detect signal.

16. The system of claim 12, the shift register having a first flip flop to output a first Last Align Detect signal.

17. The system of claim 16, the rate verification unit further including a state machine.

18. A rate verifying method, comprising:
receiving a serial input stream over a serial interconnect;
detecting an align sequence in the serial input stream;
determining at a rate verification unit whether incoming align primitives are received at a target clock rate during a predetermined number of clock periods, the rate verification unit including a shift register that is clocked at the target clock rate; and
generating a rate-verified align detect signal.

19. The method of claim 18, wherein determining whether incoming align primitives are received at a target clock rate during a predetermined number of clock periods includes using clock periods that conform to the target clock rate.

20. The method of claim 18, further comprising receiving a non-rate verified align detect signal at a first flip flop of the shift register.

21. The method of claim 18, further comprising outputting a first Last Align Detect signal from a first flip flop of the shift register.

22. The apparatus of claim 1, wherein an align primitive is received as every fourth non-rate verified align detect signal.

23. The system of claim 12, wherein an align primitive is received as every fourth non-rate verified align detect signal.

24. The method of claim 18, wherein an align primitive is received as every fourth non-rate verified align detect signal.

25. The apparatus of claim 1, wherein the rate verification unit determines whether the incoming align primitives are received at the target clock rate or some other rate.

26. The system of claim 12, wherein the rate verification unit determines whether the incoming align primitives are received at the target clock rate or some other rate.

27. The method of claim 18, wherein the rate verification unit determines whether the incoming align primitives are received at the target clock rate or some other rate.

28. The apparatus of claim 1, wherein the rate verification unit includes a detector to detect that the incoming align primitives are received prior to and in addition to determining whether the incoming align primitives are received at a target clock rate.

29. The system of claim 12, wherein the rate verification unit includes a detector to detect that the incoming align primitives are received prior to and in addition to determining whether the incoming align primitives are received at a target clock rate.

30. The method of claim 18, wherein detecting the align sequence occurs prior to and in addition to determining whether the incoming align primitives are received at a target clock rate.

* * * * *